US005377595A

United States Patent [19]

Liu

[11] Patent Number: 5,377,595

[45] Date of Patent: Jan. 3, 1995

[54] SPRING-SUPPORTED ELECTRIC CONTACT DEVICE FOR TOY VEHICLE AND TRACK ASSEMBLIES

[76] Inventor: Ting Liu, 1006 Chelsea Pl., Matthews, N.C. 28105

[21] Appl. No.: 95,175

[22] Filed: Jul. 21, 1993

[51] Int. Cl.⁶ .......................... B61B 13/00; B60L 5/00

[52] U.S. Cl. .......................... 104/118; 104/53; 238/10 R; 446/444; 191/59.1

[58] Field of Search ............... 446/444, 445, 230, 229, 446/231, 455; 191/57, 59.1; 104/93, 118, 119, 121, 53

[56] References Cited

U.S. PATENT DOCUMENTS 3,412,689 11/1968 Hawes ................................ 104/118
3,604,148 4/1971 Neuhierl ............................. 104/118

FOREIGN PATENT DOCUMENTS 930438 7/1955 Germany ............................ 446/444
2129318 5/1984 United Kingdom ................ 446/444

*Primary Examiner*—Mickey Yu

[57] ABSTRACT

A spring-supported electric contact device including a track mounting sapce in a lower part of a vehicle body for a flexible track passing through, a seesaw plastic frame pivotably fastened in an open chamber in the vehicle body beneath the track mounting space and having one end supported on a conical spring, an electric contact assembly consisted of two spaced pairs of contact nails electrical connected to the motor drive by an electric wire and fastened to the seesaw plastic frame and constantly disposed in contact with respective metallic electrical conductor strips on the flexible track to connect DC electricity supplied by a DC adapted from city power to the motor drive.

5 Claims, 5 Drawing Sheets

SPRING-SUPPORTED ELECTRIC CONTACT DEVICE FOR TOY VEHICLE AND TRACK ASSEMBLIES

BACKGROUND OF THE INVENTION

The present invention relates to self-propelled toy vehicle and track assemblies and more particularly to a spring-supported electric contact device for a self-propelled toy vehicle with a flexible track which passes through the vehicle for controlled vehicle travel therealong.

Toy vehicle and track assemblies in which a toy vehicle moves along a continuous track are well known, and several types of toy track and vehicle assemblies are currently available. These toy vehicle and track assemblies commonly use a battery DC power source installed in the toy vehicle to provide electricity to a respective motor drive so that they can be propelled to travel along a respective track. However, it is no economic to use a battery DC power source for providing electricity to the motor drive of a toy vehicle and track assembly because a battery DC power source will be used up within a short length of time when the toy vehicle is continuously propelled. Furthermore, waste battery will cause a severe environmental pollution problem. Therefore, it has become the inevitable way to get DC power from city power supply for the motor drive of a toy vehicle and track assembly through a DC adapter. By reversing the adapter or changing its phase, the vehicle is controlled to move forward or backward along the track. However, using city power supply through a DC adapter for the motor drive of a toy vehicle and track assembly is still not easy. There is still a key technical problem not satisfactorily settled. This problem is the stable electric contact between the track and the vehicle body while the vehicle is running and maneuvering on the track.

SUMMARY OF THE INVENTION

The present invention has been accomplished under the aforesaid circumstances. According to the preferred embodiment of the present invention, the spring supported electric contact device comprises an electric contact assembly fastened to a seesaw plastic frame. The seesaw plastic frame is pivotably fastened within a chamber in a lower part of the vehicle body, having one end supported on a conical spring and an opposite end terminated to a downward push rod extended out of the vehicle body through a slot thereon. Pushing the downward rod upwards causes the seesaw plastic frame to open a track inlet for allowing the track passing through a track mounting space of the vehicle body so as to mount the vehicle on the track. The electric contact assembly comprises two pairs of contact nails spaced one pair on each end of the seesaw plastic frame and disposed in contact with the metallic electrical conductor strips on the track. The upward force from the conical spring forces the electric contact assembly to constantly maintain at least one pair of contact nails in contact with the metallic electrical conductor strips on the track in any condition.

DETAILED DESCRIPTION OF THE PREFERRED EMBODIMENT

Figure 1:
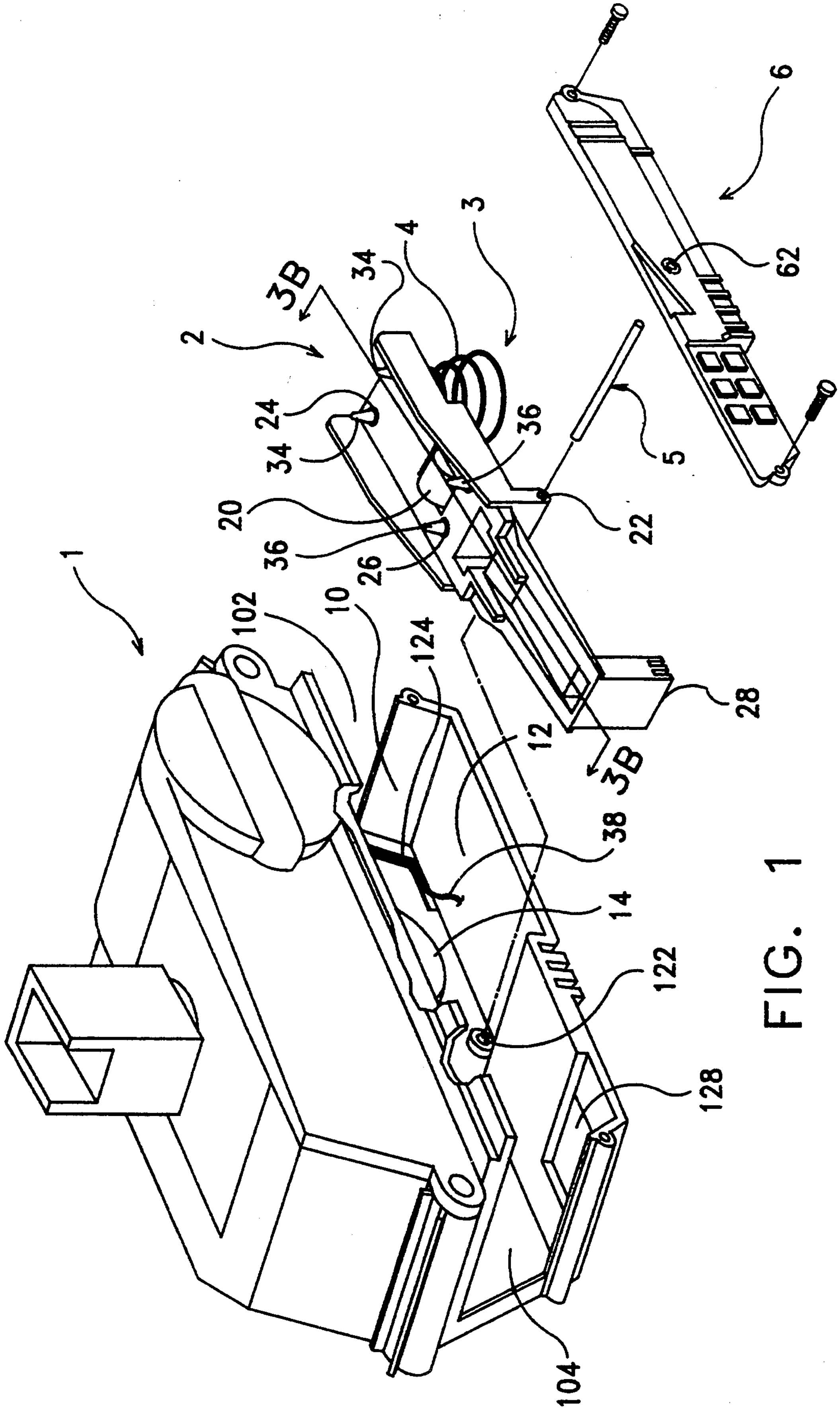
FIG. 1 is an exploded view of the preferred embodiment of the spring-supported electric contact device of the present invention.
Figure 2:
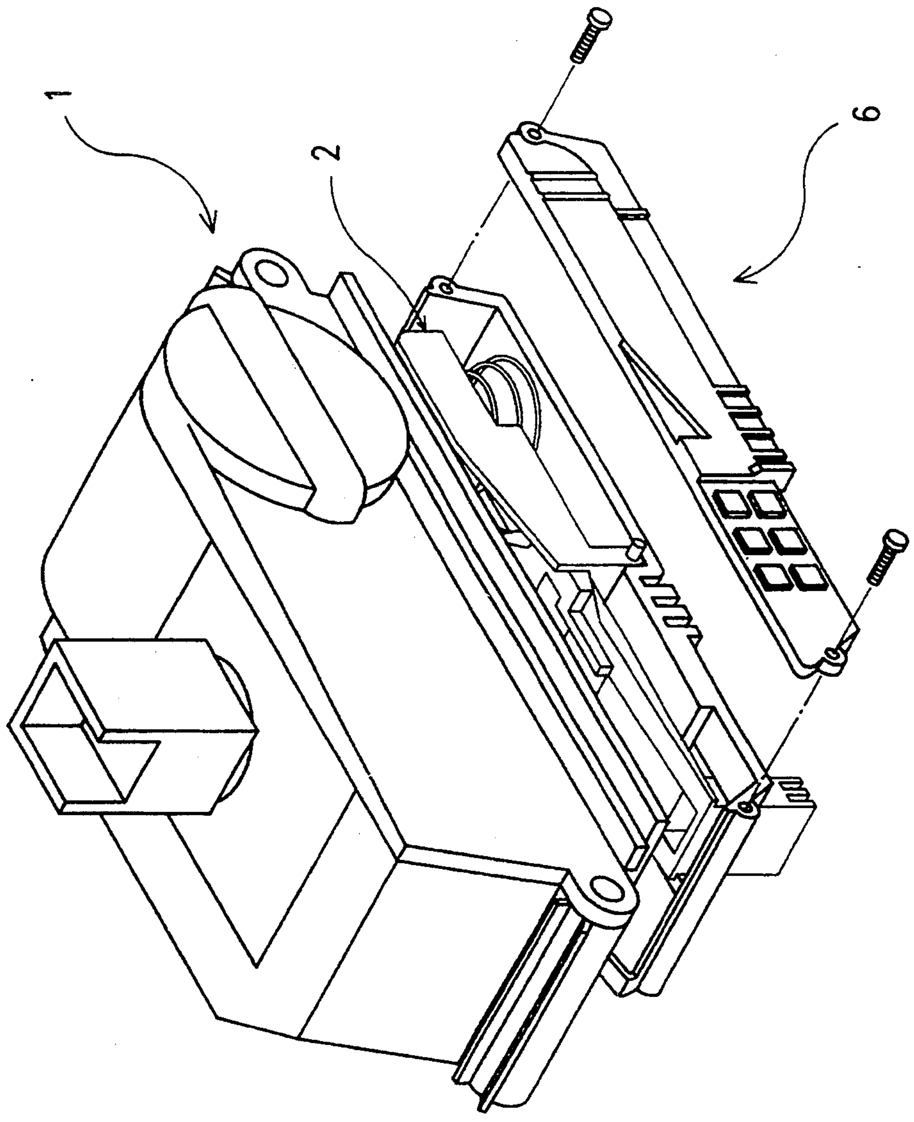
FIG. 2 is a perspective view of the spring-supported electric contact device with the side cover dismantled.
Figure 3A:
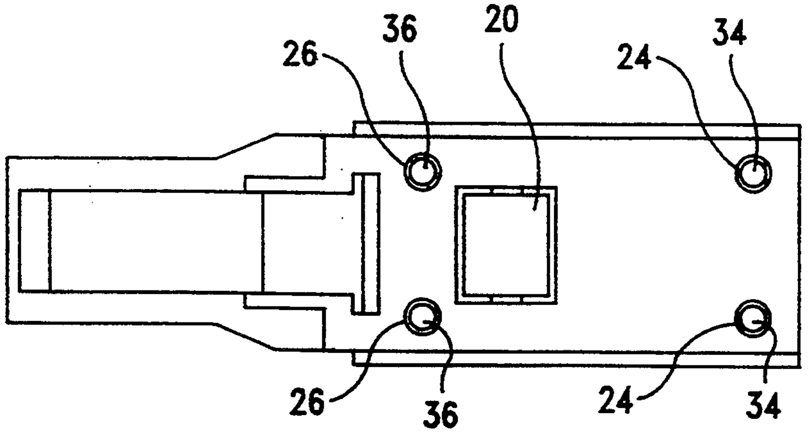
FIG. 3A is the top, view of the seesaw plastic frame of the spring-supported electric contact device.
Figure 3B:
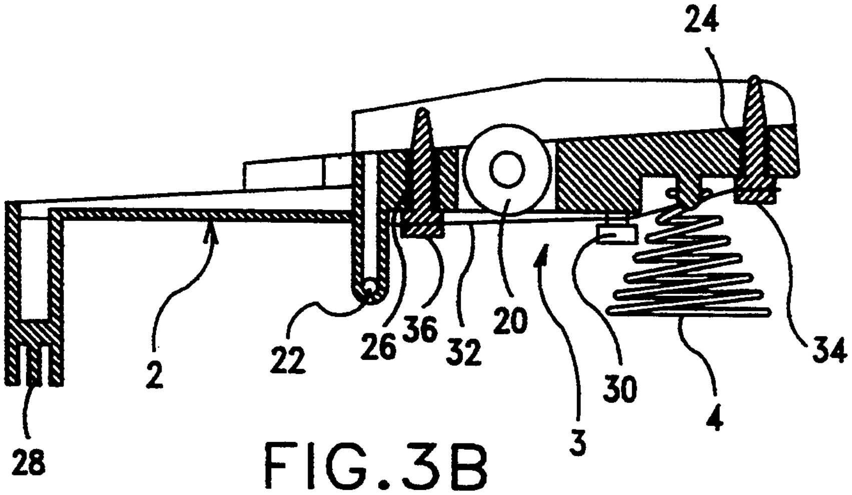
FIG. 3B is a sectional view taken along the line 3B—3B of FIG. 1.
Figure 3C:
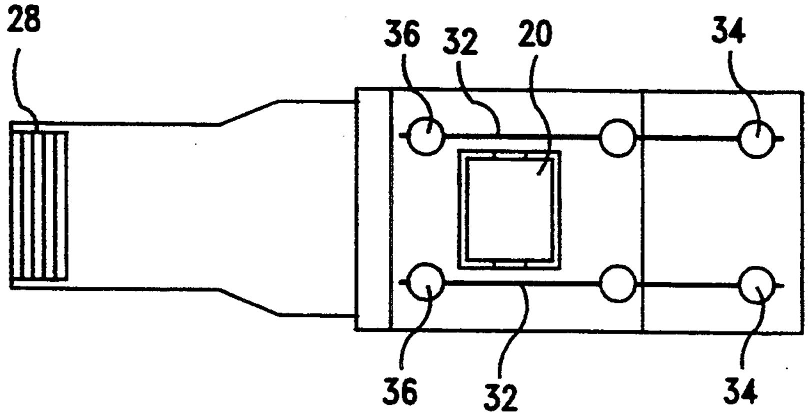
FIG. 3C is the bottom view of the seesaw plastic frame of the spring-supported electric contact device.

Referring to FIGS. 1, 2, 3A, 3B and 3C, the present invention comprises a vehicle body 1, a seesaw plastic frame 2, an electric contact assembly 3, a conical spring 4, a pivot pin 5, and a side cover 6.

The vehicle body 1 comprises a track mounting space 10 in the longitudinal direction for passing the track, which has one end terminated to a flat, narrow track inlet 102 and an opposite end terminated to a flat, narrow track outlet 104, a chamber 12 disposed below the track mounting space 10 for holding the seesaw plastic frame 2 and the electric contact assembly 3 and the conical spring 4, a pivot hole 122 on an inner side wall of the chamber 12 for mounting the seesaw plastic frame 2 and the side cover 6, a wire groove 124 along which the electric lead wires 38 is connected between the electric contact assembly 3 and the motor drive (inside the vehicle body 1; not shown), a bottom slot 128, and a friction wheel 14 driven by the motor drive and disposed above the track mounting space 10.

The seesaw plastic frame 2 has a pivot hole 22 in the middle through which the pivot pin 5 is inserted into the pivot hole 122 on the vehicle body 1 for allowing the two opposite ends of the seesaw plastic frame to be moved up and down alternatively, a free wheel 20 transversely disposed below the friction wheel 14 on the vehicle body 1, a first pair of small through holes 24 bilaterally disposed near one end thereof, a second pair of small through holes 26 bilaterally disposed between the free wheel 20 and the pivot hole 22, a downward push rod 28 disposed on an opposite end thereof at right angles and inserted out of the bottom of the vehicle body 1 through the bottom slot 128.

The electric contact assembly 3 comprises two screw terminals 30 fastened to the seesaw plastic frame 2 at the bottom, two main contact nails 34 respectively fastened to the first pair of small through holes 24, two auxiliary contact nails 36 respectively fastened to the second pair of small through holes 26, two phoshor-bronze wires 32 each having one end fastened to either main contact nail 34 and an opposite end wound round the respective screw terminal 30 and then fastened to the respective auxiliary contact nail 36, and the electric lead wires 38 connected between the screw terminals 30 and the two opposite poles of the motor drive in the vehicle body 1.

The conical spring 4 is supported between the seesaw plastic frame 2 and the bottom wall of the chamber 12.

The side cover 6 has a pivot hole 62 in the middle connected to the pivot hole 22 on the seesaw plastic frame 2 and the pivot hole 122 on the vehicle body 1 by the aforesaid pivot pin 5.

Figure 4:
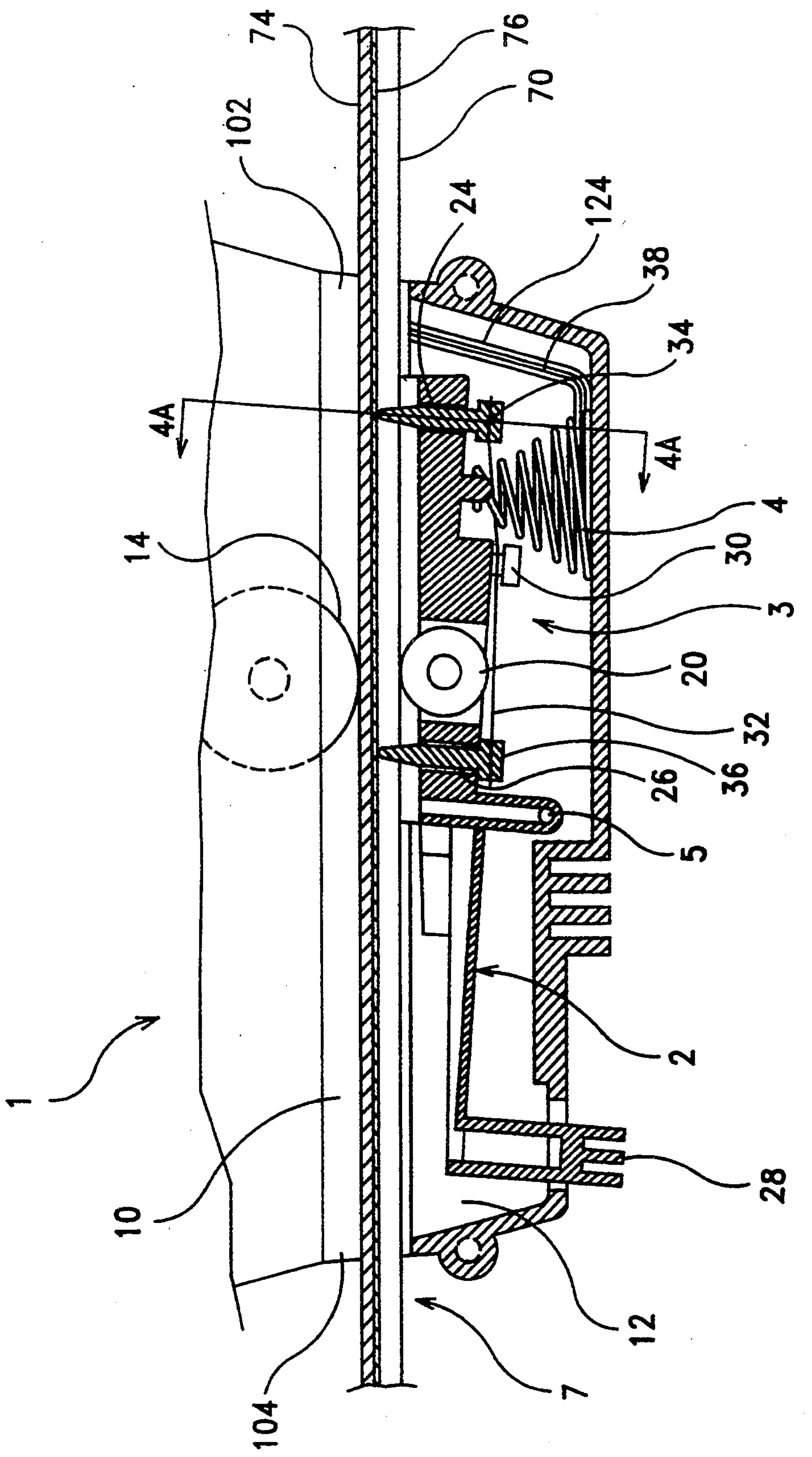
FIG. 4 is a longitudinal section view of the spring-supported electric contact device when mounted on the track.
Figure 4A:
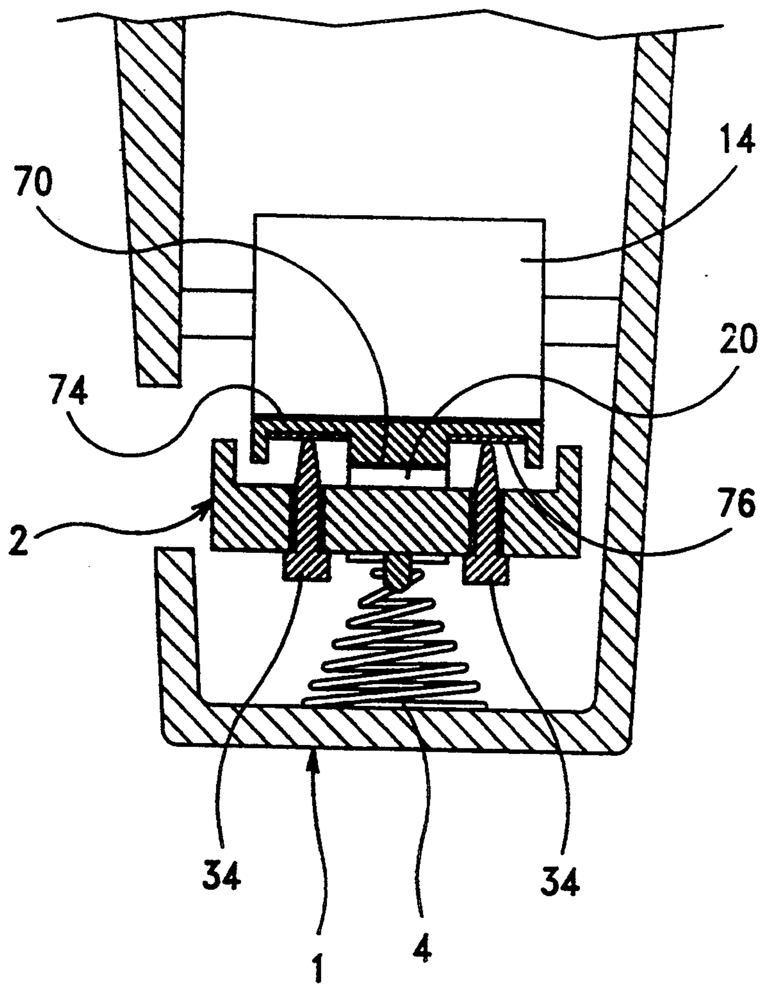
FIG. 4A is a cross sectional view taken along line 4A—4A of FIG. 4.

Referring to FIGS. 4 and 4A when assembled, the rear end of the seesaw plastic frame 2 is supported by the conical spring 4 to contact the bottom wall of the chamber 12, therefore the track inlet 102 is closed and, the push rod 28 of the seesaw plastic frame 2 is constantly forced downward to extend out of the bottom slot 128. By pushing the push rod 28 upward to move the opposite end of the seesaw plastic frame downward, the track inlet 102 is opened for inserting the track 7. As the vehicle body 1 is mounted on the track 7, the friction wheel 14 is disposed in contact with the top friction surface 74 of the track 7, the free wheel 20 is disposed in contact with the bottom surface 70 of the track 7, and the main and auxiliary contact nails 34,36 are disposed in contact with the two metallic electrical conductor strips 76 in respective grooves (not shown) along the length of the track 7. By means of the main and auxiliary contact nails 34,36 of the electric contact assembly 3 are constantly and electrically disposed in contact with the metallic electrical conductor strips 76 of the track 7 as the vehicle body 1 is traveling along any part of the track 7 which may be turned upside down or extended at an upward or downward inclination.

What is claimed is:

1. A spring-supported electric contact device for toy vehicle and track assemblies comprising:

a vehicle body having a track mounting space extending from a front end to a rear end of said vehicle body, said space adapted to allow a flexible track to pass through said vehicle body, said vehicle body further having a side wall at a lower portion thereof and defining a first boundary of a chamber below said track mounting space, said wall including a pivot hole;

a seesaw frame having a pivot hole in an intermediate portion thereof and having one end supported on a conical spring;

an electric contact assembly fastened to said seesaw frame and disposed for constant contact with metallic electrical conductor strips fastened to the flexible track;

a side cover having a pivot hole in an intermediate portion thereof, said side cover defining a portion of said vehicle body and defining a second boundary of said chamber; and a pivot pin extending through said pivot hole in said seesaw frame and supported at its respective ends by the respective pivot holes in said side wall and said side cover.

2. The device of claim 1 wherein said track mounting space is defined by a flat, rectangular opening at said front end and a flat, rectangular opening at said rear end of said vehicle body; and a friction wheel located in said vehicle body for being in constant contact with the flexible track.

3. The device of claim 1 wherein said vehicle body further comprises a horizontal bottom wall connected to said side wall and defining a lower boundary of said chamber, said horizontal bottom wall having a slot opening therein; and said seesaw frame further having a downwardly and vertically extending front end projecting outwardly through said slot opening of said horizontal bottom wall.

4. The device of claim 3 wherein said seesaw frame has a freely rotatable wheel transversely disposed in a middle portion thereof and adapted for contacting the bottom surface of the flexible track.

5. The device of claim 1 wherein said electric contact assembly comprises:

two screw terminals fastened to a bottom surface of said seesaw frame;

two main contact nails respectively fastened to a first pair of through holes in said seesaw frame and disposed for contact with the metallic electrical conductor strips of the flexible track;

two auxiliary contact nails respectively fastened to a second pair of through holes spaced from said main contact nails and disposed for contact with the metallic electrical conductor strips of the flexible track;

two wires, each having one end fastened to a respective said main contact nails, an intermediate portion wound around a respective said screw terminals and an opposite end fastened to a respective said auxiliary contact nails; and two electric lead wires connected to respective said screw terminals and a motor drive in said vehicle body.

* * * * *